H. G. REIST.
DYNAMO ELECTRIC MACHINE.
APPLICATION FILED JUNE 20, 1904.

900,780.

Patented Oct. 13, 1908.

Witnesses:
George A. Thornton
Helen Orford

Inventor:
Henry G. Reist,
By Albert G. Davis
Att'y.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

No. 900,780.  Specification of Letters Patent.  Patented Oct. 13, 1908.

Application filed June 20, 1904. Serial No. 213,203.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

My present invention relates to the construction of dynamo-electric machines, and more particularly to the construction of the rotating field magnets of high speed alternators, though my invention in all of its aspects is not limited to use with this particular class of machines.

In the ordinary type of internal revolving field alternators windings are applied to polar projections extending radially from the axis of rotation of the field magnet. When these field magnets are rotated at high speeds such as are ordinarily employed when the field magnet is directly connected to a high speed prime mover such as a steam turbine, the centrifugal forces produced tend to distort the windings. This necessitates the use of some means for supporting or bracing the exterior of the coils as the tips of the pole-pieces which ordinarily serve to hold the windings in place assist but little in preventing this distortion.

My present invention has for its object the provision of a simple and efficient supporting device for the coil.

The various features of novelty which characterize my invention are pointed out with particularity in the claims annexed to and forming a part of this specification. For a better understanding of my invention, however, reference may be had to the accompanying drawings in which I have illustrated and described one embodiment of my invention.

Figure 1:
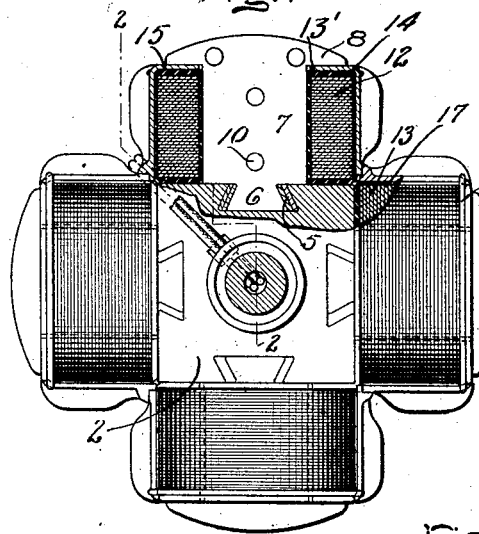
Figure 2:
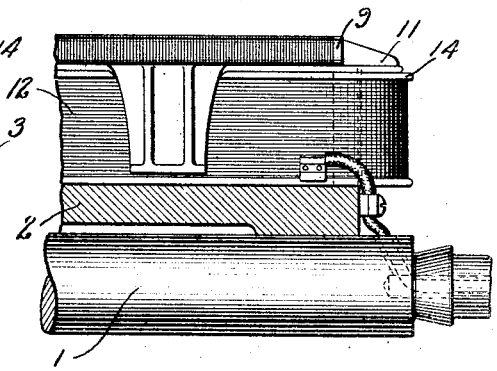
Figure 3:
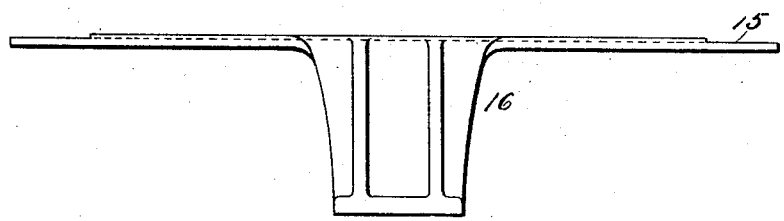
Figure 4:
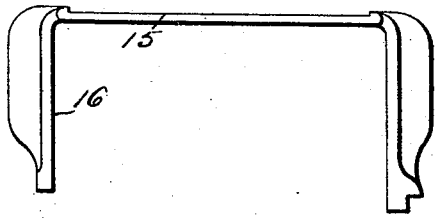
Figure 5:
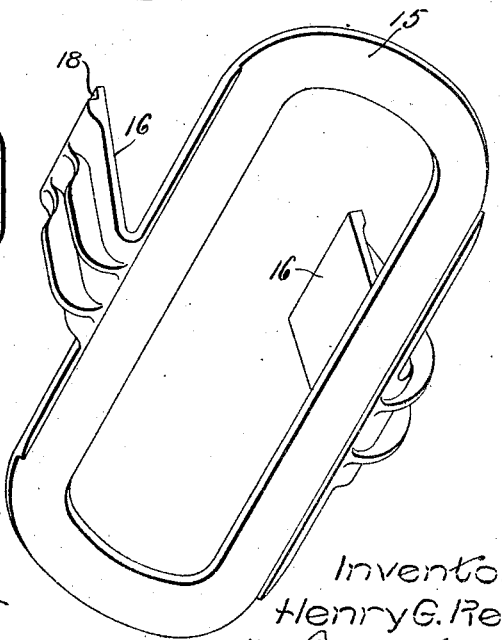

Of the drawings, Figure 1 is an end elevation with parts broken away and in section of a field magnet structure embodying my invention; Fig. 2 is a partial sectional elevation on the broken line 2 2 of Fig. 1; Fig. 3 is a side elevation of the coil support; Fig. 4 is an end elevation of the coil support; and Fig. 5 is a perspective view of the coil support.

Referring to the drawings, 1 represents the shaft of the rotating field magnet of a dynamo-electric machine. The field magnet carried by the shaft 1 comprises a body portion 2 secured to the shaft 1 in any suitable manner and polar portions 3 dovetailed into the body portion 2. Suitable wedges 5 are employed for securing the tenons 6 of the polar portions 3 into the recesses formed in the body member to receive them. Each polar body member to receive them. Each polar portion 3 comprises a body portion 7 and laterally-projecting tip portions 8. The polar portions are ordinarily formed of laminæ clamped between end members 9 by bolts 10. The end members 9 are provided with laterally-projecting tip portions 11 similar to the tip portions 8. The body portion 7 of each polar portion 3 is surrounded by a coil or winding 12. This winding may consist of an endless strap or ribbon 13 of conducting material bent edgewise to surround the body portions 7, as shown. The winding 12 is separated from the body of the field-magnet structure and from the portion 7 of the polar portions 3 by layers 13' of any suitable insulating material. A layer of insulating material 14 of substantially the same outline as the end of the coil 9 is placed against the outer end of the coil.

Immediately beyond the insulating material 14 and between it and the tip portion of the polar projection is placed the body portion or member 15 of the coil support. The body portion 15 which closely encircles the body portion 7 of the polar portion is in the form of an elongated plate having an elongated opening formed in it to receive the body of the polar portion, and is substantially the same in outline as the end of the coil or winding 12. From each of the elongated sides of the coil support wings or projections 16 extend inwardly parallel to and in close engagement with the outer sides of the coil or winding 12. The wings or projections are shown in the drawings as integrally connected to the body portion 15, though this is not always essential. Suitable insulation 17 may be employed to separate each wing or projection 16 from the winding which it supports. The coil support may advantageously be formed from some metal, such as gun metal.

In the construction shown in the drawings, the projections 16 are located midway between the ends of the elongated body portion 15. The free end of one extension 16 from each coil support is formed with a groove or recess 18 in which the free end of the adjacent projection from the coil support carried by the adjacent polar portion of the field magnet may engage as is clearly shown in Fig. 1. Thus it will be seen that each extension 16 forms a brace which bears against the exterior of the adjacent winding midway between the end members 9. The portion of the winding thus supported is that most liable to distortion by the bulging out of the sides of the coils. As the body portion 15 of each coil support is included within the field-magnet structure, the construction is neat, compact and strong. By reason of the engagement of the inner end of each projection by the inner end of the adjacent projection, the adjacent projections mutually support each other, thus materially adding to the strength and rigidity of the arrangement.

It will be readily understood that the field magnet shown coöperates with a suitable armature and that the usual means are employed for energizing the windings of the electromagnet.

I have not thought it necessary to illustrate these features in my present application as they are well understood in the art and their specific embodiment forms no part of my present invention.

What I claim as new and desire to secure by Letters Patent of the United States, is,

1. In a dynamo-electric machine, a polar projection, a winding thereon, and braces for opposite sides of said winding, said braces being integrally connected together.

2. In a dynamo-electric machine, the combination with the field poles and the windings thereon, of a support for the winding of each pole comprising a portion encircling the pole, and another portion secured thereto for engaging the exterior of the winding.

3. In a dynamo-electric machine, the combination with the field poles and the windings thereon, of a support for the winding of each pole comprising a portion encircling the pole, and another portion integrally secured thereto for engaging the exterior of the winding.

4. In a dynamo-electric machine, the combination of the field poles and the windings thereon, of a support for the winding of each pole comprising a portion encircling the pole, and other portions at right angles thereto engaging the exterior of the winding, said other portions of the supports for adjacent windings mutually engaging and supporting each other.

5. In a dynamo-electric machine, a rotating member provided with radially-extending polar projections, a winding for each polar projection, a support for each winding comprising a portion encircling the polar portion beyond the winding, and portions carried by said encircling portion for engaging the exterior of the winding.

6. In a dynamo-electric machine, a rotating member provided with radially-extending polar projections, a winding for each polar projection, a support for each winding comprising a portion encircling the polar portion beyond the winding, and other portions carried by said encircling portion for engaging the exterior of the winding, each of said other portions engaging similar portions of the support to an adjacent winding.

7. In a dynamo-electric machine, a polar projection, a winding thereon, braces for opposite sides of said windings, and means for connecting said braces together comprising a member encircling the pole-pieces.

8. In a dynamo-electric machine, a plurality of polar projections, a winding for each polar projection, and braces for the sides of said winding, each brace being secured at its outer end to the polar projection, and the inner ends of adjacent braces mutually engaging and supporting each other.

9. In a dynamo-electric machine, the combination with the field-poles and the winding thereon of a support for the winding of each pole, comprising a portion within the field-magnet structure and an outer portion engaging the exterior of the winding.

10. In a dynamo-electric machine, the combination with the field-poles and the winding thereon of a support for the winding of each pole, comprising a portion within the field-magnet structure and encircling the pole and an outer portion engaging the exterior of the winding.

11. In a dynamo-electric machine, the combination with the field-poles and the winding thereon of a support for the winding of each pole, comprising a plate within the field-magnet structure and encircling the pole and an outer portion engaging the exterior of the winding.

12. In a dynamo-electric machine, the combination with the field-poles and the winding thereon of a support for the winding of each pole, comprising a portion within the field-magnet structure and outer portions at right angles to said inner portion and engaging the exterior of the winding.

13. In a dynamo-electric machine, the combination with the field-poles and the winding thereon of a support for the winding of each pole, comprising a plate within the field-magnet structure and outer portions at right angles to said inner portion and engaging the exterior of the winding.

14. In a dynamo-electric machine, the combination with the field-poles and the winding thereon of a support for the winding of each pole, comprising a plate within the field-magnet structure and encircling the pole, and outer portions at right angles to said inner portion and engaging the exterior of the winding.

15. In a dynamo-electric machine, the combination with the field-poles and the winding thereon of a support for the winding of each pole, comprising a plate within the field-magnet structure, and outer plates at right angles thereto and integral therewith engaging the exterior of the winding.

16. In a dynamo-electric machine, a rotating field magnet having a body portion and a polar portion detachably secured thereto, said polar portion comprising a mass of magnetic material, a winding surrounding said mass, and a support for said winding comprising a portion within the field magnet structure and outer portions at right angles thereto engaging the opposite outer sides of said winding.

In witness whereof, I have hereunto set my hand this 17th day of June, 1904.

HENRY G. REIST.

Witnesses:
BENJAMIN B. HULL,
HELEN ORFORD.